June 21, 1927.
J. E. SCHELL
1,632,857
HEATING ELEMENT FOR MOTOR RADIATORS
Filed Feb. 20, 1926
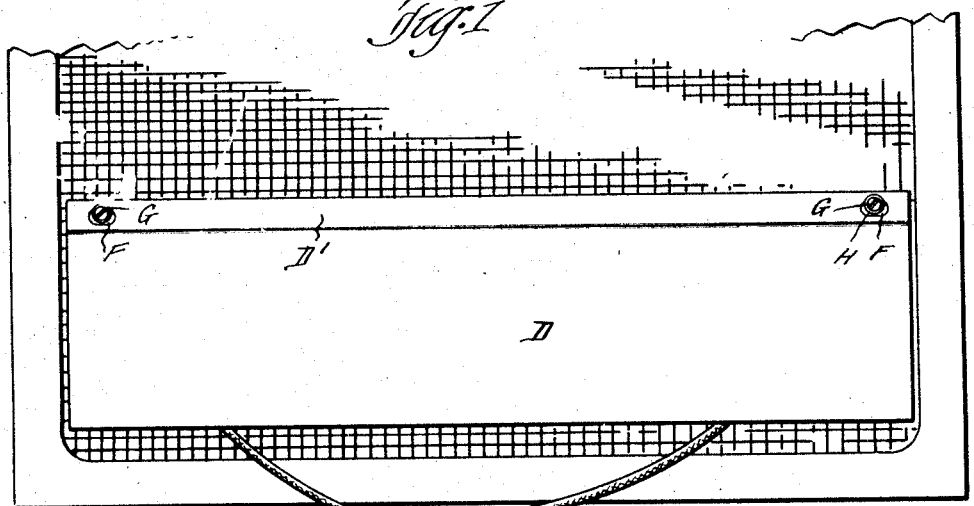
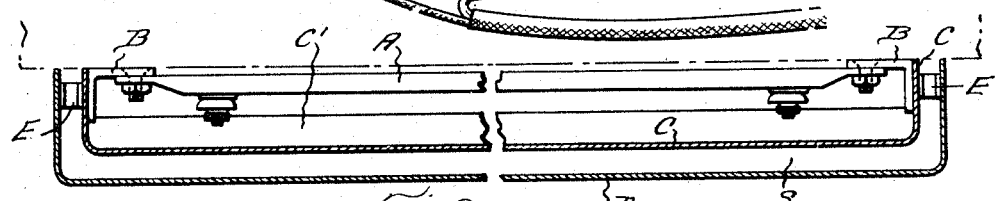
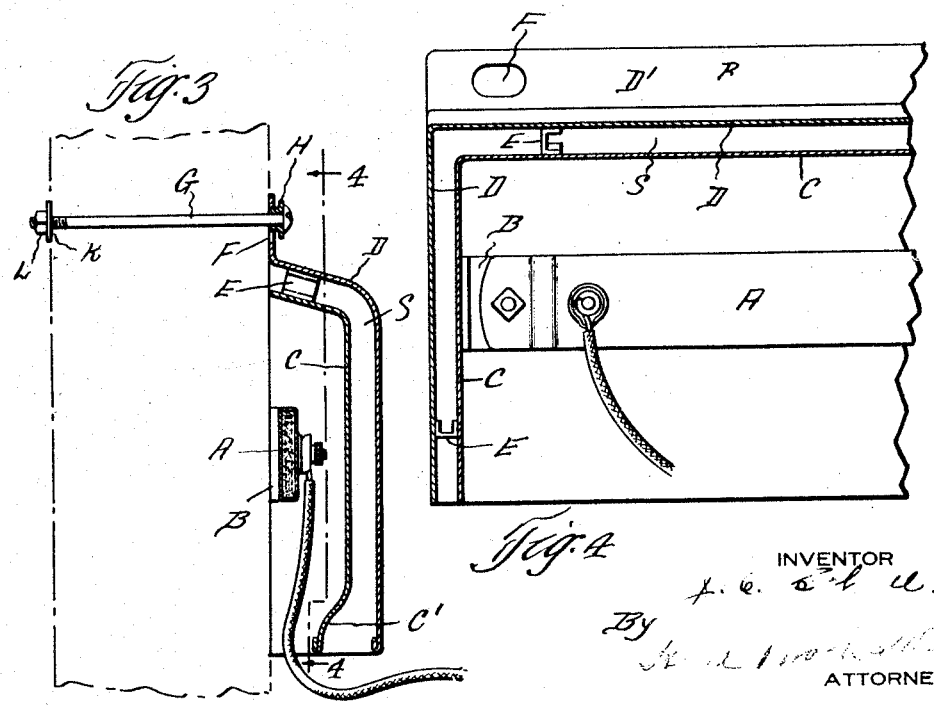
INVENTOR
J. E. Schell.
By
ATTORNEYS.

Patented June 21, 1927.

1,632,857

UNITED STATES PATENT OFFICE.

JOSEPH E. SCHELL, OF CLEVELAND HEIGHTS, OHIO.

HEATING ELEMENT FOR MOTOR RADIATORS.

Application filed February 20, 1926. Serial No. 89,620.

This invention relates to means for heating various kinds of automotive motors and the main object of the invention is to provide a means to heat the motor oil and carburetor in a simple, safe and efficient manner.

An object of the invention is to provide means to make the oil flow freely preventing damage to the motor before the oil becomes heated.

Another object of the invention is to provide means to heat the carburetor to aid in vaporizing the gas making starting easy, to prevent crank case dilution and damage to the battery.

Another object of the invention is to provide an air insulated cover permitting the blanketing of the radiator front over the cover preventing loss of heat.

Another object of the invention is to provide a simple method of hanging the heater on the various types of radiators which is made possible by using a flat elongated heating element with a shallow cover permitting use on automobiles where the space between the headlight tie bar and radiator is limited. The shallow cover also permits hanging the heater on the rear side of the radiator when a winter front or cover is used on the front of the radiator.

Another object of the invention is to provide a heating element of the block type which will eliminate all danger of igniting gasolene vapors within the hood of the automobile.

Further and more limited objects of the invention will appear as the description proceeds and by reference to the accompanying drawing in which Fig. 1 is a front elevation of a radiator having my improved heating unit secured thereto; Fig. 2 is a horizontal sectional view through Fig. 1; Fig. 3 is a vertical sectional view of Fig. 1 with the radiator shown in dot and dash lines and Fig. 4 is a vertical sectional view on the line 4—4 of Fig. 3.

In carrying out my invention I provide a block type, elongated electrical heating element A which is secured at opposite ends to angle irons B which are secured to an inner casing member C substantially as shown in Fig. 2. I also provide an outer casing member D which is rigidly secured to the member C in spaced relation thereto by means of spacing elements E which are preferably spot welded to the members C and D. The lower end of the inner casing member C extends downwardly as shown in Fig. 3 and at the lower end is flared inwardly as shown at C' in Fig. 3. The outer casing member has a portion D' having a plurality of apertures F therein through which extend bolts G as shown in Fig. 1. Secured to the outer end of the bolts G are washers H which space the outer ends of the bolt from the radiator so that the casing member D may be hung over the bolts G, as shown most clearly in Fig. 3. The bolts G extend through the radiator as shown in Fig. 3 and are secured thereto by means of washers K and nuts L. The casing members C and D are substantially U-shaped in cross section as shown in Fig. 2 and are shaped so as to provide an insulating air space S between the two casing members which allows the air currents to enter through the enlarged lower end thereof and pass upwardly around the heating element and thence inwardly towards the radiator. The cold air entering the lower end of this passage is heated and rises and passes out through the upper end of the passage through the radiator and into the interior of the hood.

If the device is to be used on a radiator having a winter front, the same may be attached on the inner side of the radiator instead of on the outer side as shown in Fig. 3. Attention is called to the fact that the elongated heating element extends practically the entire width of the radiator front and the whole unit is of such a thickness as to be secured to the radiator without projecting therefrom to any great extent. If desired, the inner side of the casing C may be polished so as to form a reflector which will tend to reflect the radiated heat inwardly and further increase the temperature within the hood. The outer casing D performs the dual function of forming an air passage about the inner casing C and of protecting the inner casing from the outside air. The casing C being heated by convection tends to warm the air as soon as it enters the passageway and the effect is that a continuous stream of hot air is flowing through the walls of the radiator into the interior of the hood when the heating element is connected with a source of current.

It will now be clear that I have provided a device which will accomplish the objects of the invention as hereinbefore stated and I wish my invention to be limited only in accordance with the scope of the appended claims.

Having thus described my invention, what I claim is:—

1. A heating device for motor radiators comprising an electrical heating element adapted to be attached to a radiator, a reflector secured to said heating element to reflect radiated heat against the radiator, a casing secured to said reflector and spaced therefrom whereby to provide a passageway for air between said reflector and casing.

2. A device for heating motor radiators comprising an inner casing and an outer casing substantially U-shaped in cross section, said casings being secured together in spaced relation whereby to provide a passageway therebetween, an electrical heating element secured within said inner casing near the mid-portion thereof, means for securing said outer casing to the radiator, said casings being so shaped that said passageway will lead upwardly adjacent said heating element and then inwardly toward the radiator, and means for supplying a current to said heating element.

3. A heating device for motor radiators comprising a casing having an inner wall and an outer wall, an electrical heating element secured to said inner wall, means for securing the outer wall of said casing to a radiator, said outer and inner walls being spaced apart whereby to provide a passageway between said walls, said passageway being coextensive with said walls, the upper end of said casing being curved inwardly toward the radiator, and means for supplying current to said heating element.

4. A heating device for automobile radiators comprising an electrical heating element of the block type, an inner casing secured to and surrounding the front and sides of said heating element, an outer casing secured to but spaced from said inner casing whereby to form a passageway between said casings, said inner and outer casings being so shaped that said passageway will lead upwardly past said heating element and thence inwardly toward the radiator and means for connecting said heating element with a source of current.

5. A heating device adapted to be secured to an automobile radiator comprising an outer casing, an inner casing secured to but spaced from said outer casing whereby to form a passageway between said casings, an electrical heating element supported within and extending substantially across said inner casing, said inner casing having a reflecting surface for reflecting radiated heat rearwardly toward the radiator, said inner and outer casings being so shaped that said passageway will lead upwardly past said heating element and thence inwardly toward the radiator and means for connecting said heating element with a source of current.

In testimony whereof, I hereunto affix my signature.

JOSEPH E. SCHELL.